(12) United States Patent
Shirakata et al.

(10) Patent No.: US 9,065,698 B2
(45) Date of Patent: Jun. 23, 2015

(54) COMMUNICATIONS APPARATUS, COMMUNICATIONS SYSTEM, COMMUNICATIONS METHOD AND INTEGRATED CIRCUIT

(75) Inventors: Naganori Shirakata, Kanagawa (JP); Daisuke Kobayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 687 days.

(21) Appl. No.: 13/322,608

(22) PCT Filed: Dec. 8, 2010

(86) PCT No.: PCT/JP2010/007130
§ 371 (c)(1),
(2), (4) Date: Nov. 28, 2011

(87) PCT Pub. No.: WO2011/121690
PCT Pub. Date: Oct. 6, 2011

(65) Prior Publication Data
US 2012/0069893 A1 Mar. 22, 2012

(30) Foreign Application Priority Data
Mar. 31, 2010 (JP) ................. 2010-084202

(51) Int. Cl.
*H04B 7/00* (2006.01)
*H04L 27/06* (2006.01)
(Continued)

(52) U.S. Cl.
CPC ............ *H04L 27/06* (2013.01); *H04L 25/0262* (2013.01); *H04L 25/49* (2013.01)

(58) Field of Classification Search
CPC ...................... G07C 2009/00793; H04L 12/12; H04L 27/261; H04L 5/023; H04W 5/023; H04W 28/26; H04W 52/0216; H04W 52/0219; H04W 52/0229; H04W 84/18; Y02B 60/50
USPC .................. 340/10.1; 455/39, 41.1, 41.2, 41.3
See application file for complete search history.

(56) References Cited

U.S. PATENT DOCUMENTS 5,525,992 A * 6/1996 Froschermeier ............. 340/10.2
6,593,845 B1 * 7/2003 Friedman et al. ........... 340/10.33
(Continued)

FOREIGN PATENT DOCUMENTS

| CN | 101641929 | 2/2010 |
|----|-----------|--------|
| JP | 8-036446  | 2/1996 |

(Continued)

OTHER PUBLICATIONS

Chinese Office Action, issued Feb. 28, 2014 (with English translation) in a Chinese application that is a foreign counterpart to the present application.
(Continued)

*Primary Examiner* — Lewis West
(74) *Attorney, Agent, or Firm* — Wenderoth, Lind & Ponack, L.L.P.

(57) ABSTRACT

A radio (102) in a sensor network and powered by electricity includes a data communicating unit (114) performing data communication; and a pulse interval demodulating unit (111) configured to (i) detect, from a signal (11c) with signals for corresponding frequency channels overlapped, a frequency channel indicated by a time interval between two pulses in a wake-up signal (1R) included in one of the frequency channels and (ii) cause the data communicating unit (114) to perform the data communication over the detected frequency channel.

10 Claims, 13 Drawing Sheets

(51) Int. Cl.
*H04L 25/02* (2006.01)
*H04L 25/49* (2006.01)

(56) References Cited

U.S. PATENT DOCUMENTS

| | | | |
|---|---|---|---|
| 6,920,342 B2 | 7/2005 | Reiner | |
| 8,351,490 B2 | 1/2013 | Chen et al. | |
| 2002/0169009 A1 | 11/2002 | Reiner | |
| 2006/0194564 A1 | 8/2006 | Hokimoto et al. | |
| 2006/0255131 A1* | 11/2006 | Stewart | 235/383 |
| 2008/0144560 A1 | 6/2008 | Jia et al. | |
| 2010/0080270 A1 | 4/2010 | Chen et al. | |
| 2010/0314452 A1* | 12/2010 | Yeo et al. | 235/492 |

FOREIGN PATENT DOCUMENTS

| | | |
|---|---|---|
| JP | 2002-084210 | 3/2002 |
| JP | 2004-147047 | 5/2004 |
| JP | 3574388 | 10/2004 |
| JP | 2007-173904 | 7/2007 |
| JP | 2009-186360 | 8/2009 |
| JP | 2010-68402 | 3/2010 |
| JP | 2010-514274 | 4/2010 |
| JP | 2010-171859 | 8/2010 |
| JP | 2010-245740 | 10/2010 |
| WO | 01/45280 | 6/2001 |
| WO | 2005/013637 | 2/2005 |
| WO | 2006/092687 | 9/2006 |
| WO | 2006/124099 | 11/2006 |
| WO | 2008/069626 | 6/2008 |
| WO | 2008/076882 | 6/2008 |
| WO | 2009/118012 | 10/2009 |

OTHER PUBLICATIONS

International Search Report issued Mar. 1, 2011 in International (PCT) Application No. PCT/JP2010/007130.
Extended European Search Report issued Aug. 1, 2014 in corresponding European Application No. 10848872.7.

* cited by examiner

COMMUNICATIONS APPARATUS, COMMUNICATIONS SYSTEM, COMMUNICATIONS METHOD AND INTEGRATED CIRCUIT

TECHNICAL FIELD

The present invention relates to wireless communications methods for selecting a channel for communication from among two or more frequency channels to transmit a wake-up signal for activating a communication partner, and wireless communications apparatuses for the wireless communication.

BACKGROUND ART

Recently, wireless communications systems, such as the Radio Frequency Identification (RFID) and a wireless sensor net work, have been attracting attention. Such systems less frequently (at several hundred milliseconds to several hours' intervals) transmit and receive a small amount of data. Designed small and powered by a battery, a wireless communications apparatus used in such wireless communications systems has to have a long operational lifetime (several months to several years). For the wireless communications apparatus, the standby time for reception consists of most of the operating time. Hence, the wireless communications apparatus has to be operated on ultralow power.

There is a technique introducing a combination of a power-saving wireless apparatus for wake-up and a power saving wireless apparatus for data communication in order to reduce power consumption during the standby time for reception. Patent Literature 1, for example, discloses a technique to utilize a frequency Fa for wake-up and a frequency Fg for data communication, and a filter separating the frequencies with each other. When the wake-up signal is detected, a wireless unit for data communication is activated.

Furthermore, Patent Literature 2 discloses a technique to employ an ON-OFF Keying (OOK) modulating signal, which requires little power for the transmission and reception, so as to notify a communications partner of a frequency channel to be used for the data communication. The technique in Patent Literature 2 shows the following: wake-up signals are OOK-modulated, and each of the OOK-modulated wake-up signals is transmitted simultaneously over a corresponding one of frequencies which are different with each other, the transmitted signals are demodulated for each of the frequencies at the reception side, and the data communication is established using the frequency with which the wake-up signal is successfully received.

CITATION LIST

Patent Literature

[PTL 1]
U.S. Pat. No. 6,920,342
[PTL 2]
Japanese Unexamined Patent Application Publication No. 2007-173904

SUMMARY OF INVENTION

Technical Problem

In order to mutually notify communication partners of a frequency channel to be used for data communication in a wireless communications system in which two or more frequency channels are available, a channel search and a negotiation are essential. Hence, the synchronization for the channel search and the negotiation inevitably requires extra time and power. In addition, a wireless communications system handling very little data communication inevitably consumes extra power for overhead for synchronizing start-up time between the communication partners. Even though the wireless apparatus for wake-up disclosed in Patent Literature 1 can reduce power consumption during the standby time for reception, the wireless apparatus has a frequency channel dedicated to wake-up. This decreases the use efficiency of the frequencies. Furthermore, the technique in Patent Literature 1 requires a narrowband filter unit and a frequency converter for detecting a dedicated frequency channel. In other words, detecting a frequency in a narrow bandwidth requires a super heterodyne system, which additionally requires a narrowband filter, a mixer, and an oscillator that are relatively power-saving. Unfortunately, this structure results in a higher circuit cost and more consumption power.

The present invention is conceived in view of the above problems and has an object to provide a power-saving wireless communications method for notifying a communication partner of a frequency channel for data communication from among two or more frequency channels, eliminating the need for a frequency channel dedicated to wake-up, so as to transmit and receive a wake-up signal, and a wireless communications apparatus for the wireless communications method.

Solution to Problem

In order to solve the above problems, a first communications apparatus according to an aspect of the present invention includes: a data communicating unit which performs data communication; and a frequency channel detecting unit which (i) detects, from a signal (See the signal 11c in FIGS. 11 to 14) with signals for corresponding frequency channels overlapped, a frequency channel (See the frequency channel information 112I in FIGS. 1, 12, and 13) indicated by a time interval (See FIG. 6 and the interval 1Rx in FIG. 12) between two pulses in a wake-up signal included in one of the frequency channels and (ii) causes the data communicating unit to perform the data communication over the detected frequency channel.

It is noted that the signal with the overlapped signals for the frequency channels has a bandwidth (See the bandwidth 41 in FIG. 4) wider than a bandwidth (See the bandwidth 42) for one frequency channel, such as the bandwidth for the one frequency channel. This feature eliminates the need for the super heterodyne technique used for the reception of a narrow bandwidth (See the bandwidth 42). Accordingly, the feature prevents the use of great power consumption and a complex design for the reception, which leads to less power usage and simpler designing.

A second communications apparatus includes: a data communicating unit which performs data communication over a frequency channel selected from among frequency channels with a first communications apparatus which is different from the second communications apparatus; and an interval control unit which transmits, to the first communications apparatus, a wake-up signal including two pulses whose time interval indicates the selected frequency channel.

Hence, even though the first communications apparatus operates by low power and has a simpler structure, a signal, suitable to the first communications apparatus working on low power, is transmitted so that the first communications apparatus operates surely and appropriately.

Advantageous Effects of Invention

In the present invention, the difference between frequency channels is replaced with a code and a pulse interval, and transmitted. Thus, the present invention makes it possible to detect on which channel a signal is transmitted, using the pulse interval and the code, even though the signal is overlapped with a signal for another frequency channel in reception. Accordingly, a frequency channel which suits a radio wave condition can be selected between the transmitter and the receiver with no channel search or negotiation, and the wake-up signal can be transmitted and received. Furthermore, the features added to the pulse interval allow two or more channels to be overlapped, and increase more intervals having no signal. This provides a wireless communications apparatus that can reduce power consumption for transmission.

In other words, the super heterodyne technique is not used and the power consumption decreases. In addition, the reception bandwidth (See the bandwidths 41 and 42) is a relatively wide bandwidth (the bandwidth 41) even though the super heterodyne technique is used. This prevents generation of inappropriate signals (such as signals having much noise and great noise), and generates appropriate signals. Specifically, an appropriate operation according to an appropriate signal can be maintained. In addition, the operation is carried out simply using an interval of pulses, which contributes to making the structure of the communications apparatus simple. Thus, the communications apparatus can work on low power consumption and operate appropriately, in a simple structure.

DESCRIPTION OF EMBODIMENT

Figure 1:
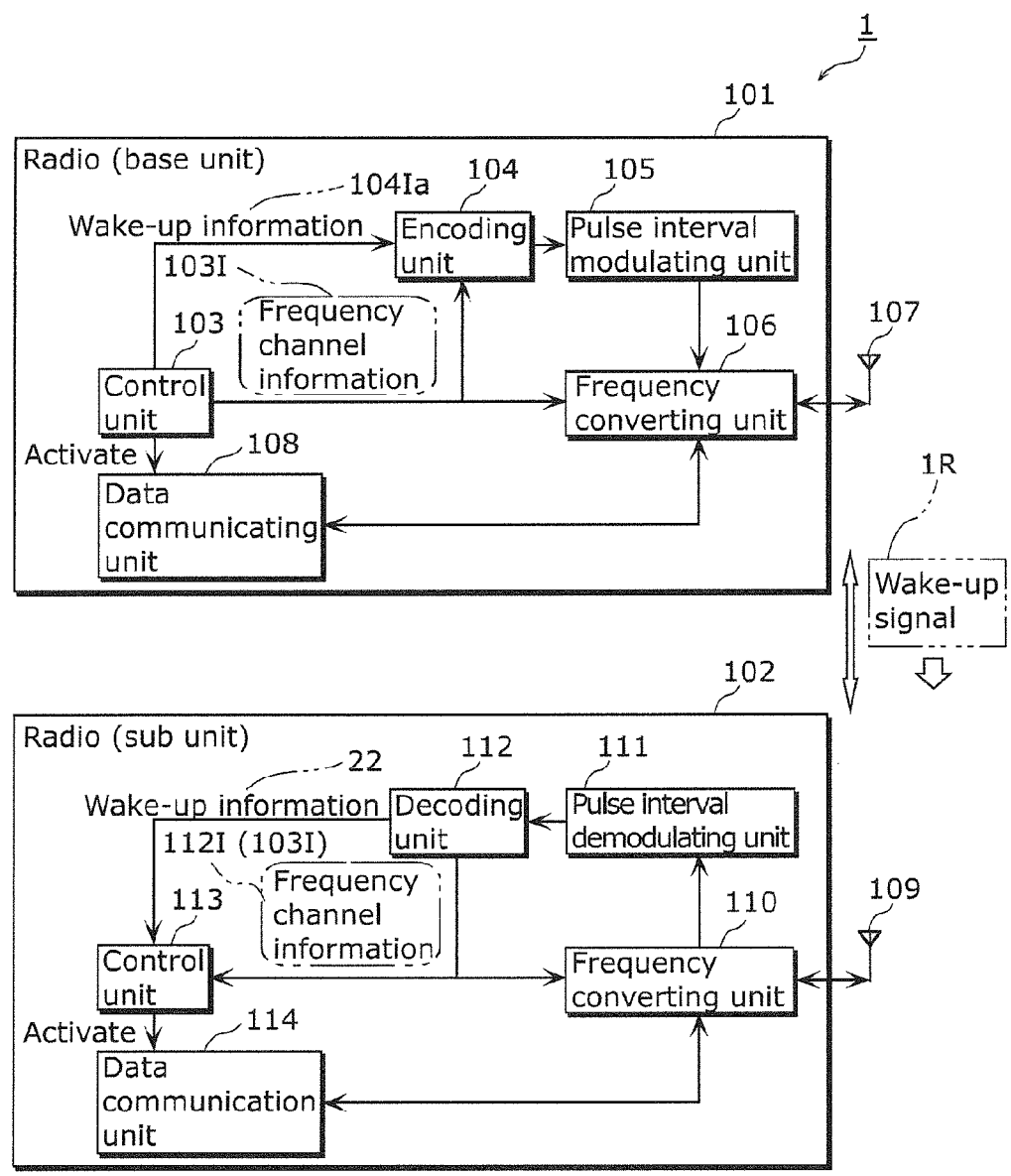
FIG. 1 depicts a block diagram showing a structure of a communications apparatus according to an embodiment.

Described below is an embodiment of the present invention, with reference to the drawings.

A first communications apparatus according to the embodiment (a sub unit 102 in FIGS. 1, 12, and the like) includes: a data communicating unit (a data communicating unit 114) which performs data communication; and a frequency channel detecting unit (a pulse interval demodulating unit 111) which (i) detects, from a signal (an input signal 110A in FIGS. 11, 13, and the like) with signals for corresponding frequency channels overlapped (FIG. 4), a frequency channel (frequency channel information 112I in FIG. 13) indicated by a time interval between two pulses in a wake-up signal (a wake-up signal 1R and 51s in FIG. 5) included in one of the frequency channels and (ii) causes the data communicating unit to perform the data communication using the detected frequency channel.

Moreover, a second communications apparatus (a base unit 101) includes: a data communicating unit (a data communicating unit 108) which performs data communication over the frequency channel selected (by a control unit 103) from among the frequency channels with the first communications apparatus (the sub unit 102) which is different from the second communications apparatus; and an interval control unit (a pulse interval modulating unit 105) which causes the first communications apparatus to transmit a wake-up signal (a signal 11a and the like in FIG. 11) including two pulses whose time interval indicates the selected frequency channel.

Figure 3:
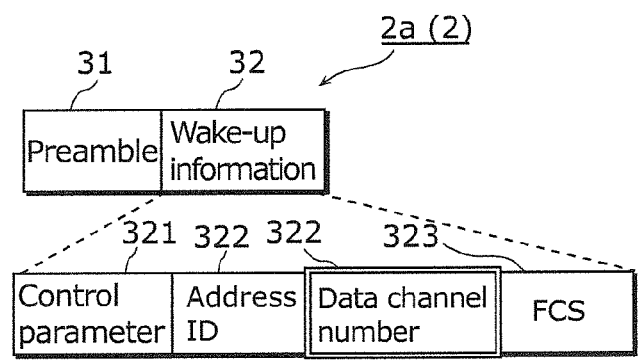
FIG. 3 exemplifies another wake-up packet.

In other words, the signal with the overlapped frequency channels is, for example, a low frequency signal (a signal 11c in FIG. 11) (i) generated from an input signal (the input signal 110A in FIG. 13), including radio frequency signals for the corresponding frequency channels, by a frequency converting unit 110 (in FIG. 3 and the like) and (ii) including low frequency signals each for a corresponding one of the frequency channels. Then, the pulse interval demodulating unit 111 detects, out of the generated low frequency signal, whether or not the wake-up signal including the two pulses having the interval has been transmitted over the one frequency channel. When the transmission is detected, the data communication will be established.

Thus, the first and the second communication apparatuses do not receive signals in a relatively narrow bandwidth (a bandwidth 42 in FIG. 4), which contributes to eliminating the need for the super heterodyne system and consuming less power. With a simple structure, the first and the second communication apparatuses only transmit the wake-up signal 1R including two pulses having an interval indicating an appropriate frequency channel, so that the communications apparatuses successfully perform data communication over an appropriate frequency channel. This feature makes it possible to achieve lower power consumption and a more simple structure.

Described below are the details of an implementation of the present invention.

FIG. 1 is a block diagram of a communications apparatus (a system 1).

In FIG. 1, radios 101 (a base unit) and 102 (a sub unit) respectively carry out wake-up transmission and wake-up reception.

The radio 101 includes a control unit 103, an encoding unit 104, a pulse interval modulating unit 105, a frequency converting unit 106, an antenna 107, and a data communicating unit 108.

The radio 102 includes an antenna 109, a frequency converting unit 110, a pulse interval demodulating unit 111, a decoding unit 112, a control unit 113, and a data communicating unit 114.

Always on reception standby, the radio 102 receives and demodulates the wake-up signal 1R transmitted from the radio 101. When the demodulated wake-up signal 1R is addressed to itself (the radio 102), the radio 102 activates the data communicating unit 114 and starts the data communication. Then, when the data communication ends, the radio 102 causes the data communicating unit 114 to go back to the sleep mode to save power consumption, and returns to the reception standby to wait for the reception of the wake-up signal 1R. The radio 102 repeats these operations.

Figure 4:
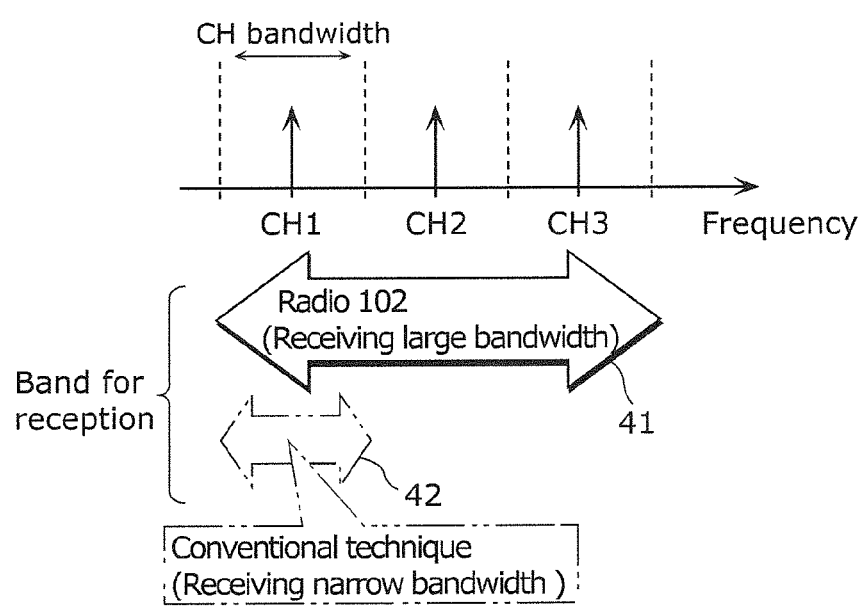
FIG. 4 exemplifies a frequency channel.

FIG. 4 exemplifies a frequency channel used by the communications apparatuses.

In FIG. 4, the horizontal axis shows frequency and vertical arrows show the central frequencies of the frequency channels. Here, three channels (frequency channels); namely, CH1, CH2, and CH3, are predetermined. Each of the channels has a predetermined channel bandwidth. In communicating over each channel, a wireless communication is performed in the channel bandwidth of the channel.

It is noted, for example, that the 950 MHz band in Japan allows a channel for a channel bandwidth of 200 kHz to be used for 24 channels.

In other words, the communications apparatuses select frequency channels for the use of their communication from among the frequency channels, synchronize the frequency channels to be set for both of transmission and reception, and performed communication. The communications apparatus use the frequency channels to transmit and receive the wake-up signal and a data communication signal. It is noted that the wake-up signal and the data communication signal are transmitted and received in a packet communication.

As described above, for example, 24 frequency channels may be included in the frequency channels to be used. Three channels, such as CH1 to CH3, may be included as shown in FIG. 4. There may be another number of channels. FIG. 4 schematically exemplifies the case of three frequency channels.

Figure 2:
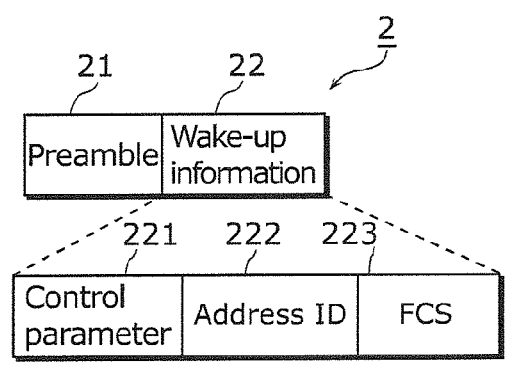
FIG. 2 exemplifies a wake-up packet.

FIG. 2 exemplifies a wake-up packet 2 for the communications apparatuses.

The wake-up packet 2 includes a preamble section 21 for synchronizing a transmitter and a receiver, and wake-up information (a wake-up information section) 22.

The preamble section 21 is a signal for synchronizing frequencies and times between the transmitter and the receiver. For example, the preamble section 21 includes a waveform repeating a 0 and a 1, and a portion having a unique word for detecting a packet (See FIG. 5, for example).

The wake-up information 22 contains information to a radio (the sub unit 102) to be woken-up, and includes a control parameter 221, an address ID 222, and a frame check sequence (FCS) 223.

The control parameter 221 includes information indicating the modulation and demodulation, and a kind of the wake-up packet 2, such as a length, a modulation scheme, and a kind of a control command of the wake-up information 22.

The address ID 222 includes information indicating the address of the wake-up packet 2.

In the case where only one of the radios is woken up, for example, the ID of the radio to be woken up may be included in the address ID 222. In the case where each of two or more of the radios included in a specific group (sub units 102a and 102b in FIG. 17, for example) is to be woken up, the group ID may be included in the address ID 222 in order to specify the group including the two or more radios. In the case where all the radios receiving the packet (sub units 102a to 102c in FIG. 17, for example) are to be woken up, the address ID 222 may include the broadcast ID. Furthermore, the address ID 222 may include two or more of IDs and the ID of the source (the base unit 101).

The FCS 223 is a bit string for detecting whether or not an error is found in the demodulated wake-up information 22. For example, used as the FCS 223 may be an error-detecting code such as a Cyclic Redundancy Check (CRC) code may be used.

The receiver (the sub unit 102) receives and demodulates the wake-up packet 2. When the FCS 223 detects that no demodulation error is found, the receiver (sub unit 102) controls the operations itself based on the wake-up information 22.

Detailed hereinafter is transmission and reception of the wake-up packet 2, with reference to FIG. 1.

When determining that the radio 101 performs the data communication with the radio 102, the control unit 103 generates a bit string of the wake-up information 22, and inputs the generated bit string into the encoding unit 104.

In addition, the control unit 103 determines which frequency channel is used for the communication, and inputs frequency channel information 1031 indicating the determined frequency channel into each of the encoding unit 104 and the frequency converting unit 106.

Based on the frequency channel information 1031 inputted by the control unit 103, the encoding unit 104 encodes the bit string (wake-up information 1041a) of the wake-up information 22 to be inputted from the control unit 103, using a code (See FIG. 6) corresponding to the frequency channel indicated by the frequency channel information 1031. Shown below are the codes corresponding to the frequency channels.

Figure 6:
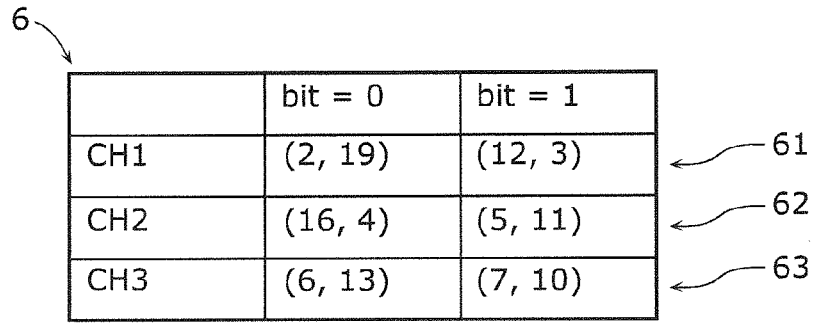
FIG. 6 exemplifies a pulse interval code.

FIG. 6 exemplifies a table (a table 6) to be used for the encoding.

FIG. 6 exemplifies the encoding in the communication over the frequency channel CH1 such that an information bit 0 and an information bit 1 are respectively represented in symbols (2,19) and (12,3) (the first code). Similarly, in the communication on the frequency channel CH2, the information bit 0 and the information bit 1 are respectively encoded into symbols (16,4) and (5,11) (the second code). In the communication over the frequency channel CH3, the information bit 0 and the information bit 1 are respectively encoded into symbols (6,13) and (7,10) (the third code). After encoded as described above, the wake-up information 22 is inputted into the pulse interval modulating unit 105.

In other words, for example, the encoding unit 104 encodes the bit string of the wake-up information 22 generated by the control unit 103, using a code (a code 61) among two or more kinds of codes (codes 61 to 63). The code to be used corresponds to a frequency channel (CH1, for example) determined by the control unit 103.

It is noted that, for example, the decoding unit 112 in the sub unit 102 may use a code to specify the frequency channel corresponding to the code as the frequency channel for the data communication. The details thereof shall be described later.

Figure 5:
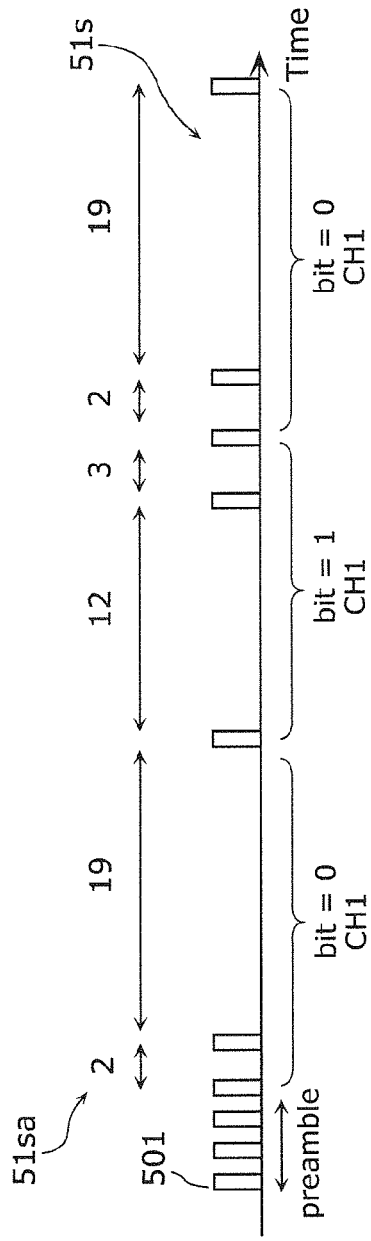
FIG. 5 exemplifies a pulse interval modulation signal.

FIG. 5 exemplifies a pulse interval modulation signal (a signal 51s) generated by the pulse interval modulating unit 105.

In FIG. 5, the horizontal axis shows time, and 501 denotes a pulse. The pulse interval modulation involves carrying out modulation by associating an interval between the pulses with an information bit.

Upon receiving an input from the encoding unit 104, the pulse interval modulating unit 105 first outputs the preamble section (See "preamble" in FIG. 5). The preamble section is generated when the pulse is repeated for a predetermined time at a predetermined interval; that is, an interval having the same width as the pulse 501 (referred to as a reference interval of 1).

Following the output of the preamble section, the pulse interval modulating unit 105 modulates a pulse interval of the wake-up information 22. Here, the pulse interval modulating unit 105 replaces the information encoded by the encoding unit 104 with a pulse interval, and generates pulses. FIG. 5 shows the case where the communication is performed over the frequency channel CH1. When a bit string 0,1,0 is transmitted, the encoding unit 104 encodes the bit string into (2,19), (12,3), and (2,19), based on the encoding table (a code table) in FIG. 6.

The pulse interval modulating unit 105 generates pulses at the intervals based on the encoding table. With respect to the reference interval 1 generated by the preamble section, a bit 0 is represented by the pulse train having three pulses with an interval 2 and an interval 19 in between and a bit 1 is represented by the pulse train having three pulses with an interval 12 and an interval 3 in between.

Hence, the pulse interval modulating unit 105 encodes the bit string of the wake-up information 22 into a pulse interval (such as an interval 51sa) according to the frequency channel so as to generate a pulse interval modulating signal (the signal 51s). The rule (a code corresponding to a frequency channel in the encoding table) of the pulse interval changes for each frequency channel. Thus, even though a receiver detects pulses of frequency channels overlapped with each other, the pulse interval demodulation based on the encoding table successfully separates the frequency channels, and reproduces the information bits.

It is noted that the symbol length of a symbol (code) representing each bit may be the same or different for each bit. In FIG. 6, for example, a bit of a 0 is represented by (2, 19), and the symbol length is 2+19=21 except the pulse length. A bit of a 1 is represented by (12, 3), and the symbol length is 12+3=15 except the pulse length. When the symbol lengths are different; that is, there is an imbalance between the information bits 1 and 0, a shorter symbol length is assigned to a bit string having more probability of occurrence. Accordingly, the packet can be made short.

Take a state of frequency channels into consideration, for example. A frequency channel used for many stations has a code with a short symbol length assigned, so that a usage efficiency of time can be improved. Furthermore, when the symbol lengths of the bits are the same with each other, employed may be modulation and demodulation processing similar to the pulse-position modulation. Various kinds of codes are used as the codes for determining pulse intervals. For example, the pseudo-random sequences including the PN sequence or the M sequence may be used. Furthermore, the codes may be based on the Walsh-Hadamard code or a Gold code, both of which have a low cross-correlation within a set codes. More preferably, the codes may have a low cross-correlation between the codes and have high distinctiveness of any given time shift, so that the separation of the symbols and of the frequency channels is accurately made even though a receiver detects overlapped pulses.

The pulse train (the signal 51s) outputted from the pulse interval modulating unit 105 is inputted to the frequency converting unit 106, converted into a radio-frequency wireless signal, and transmitted from the antenna 107.

Figure 7:
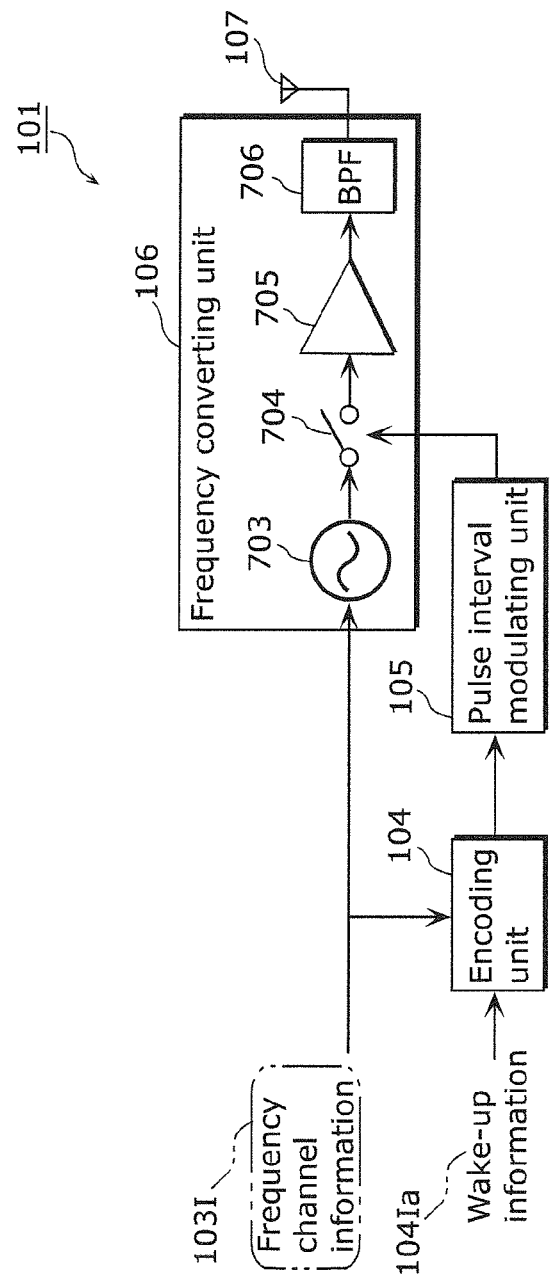
FIG. 7 exemplifies a block diagram of a structure of a radio.

FIG. 7 exemplifies a block diagram of the frequency converting unit 106.

In FIG. 7, 703, 704, 705, and 706 respectively denote an oscillator, a switch, an amplifier, and a bandpass filter. The other constituent features share the same reference signs as those in FIG. 1, and the details thereof shall be omitted.

Based on the frequency channel information 1031 from the control unit 103, the oscillator 703 generates a radio-frequency carrier signal of a frequency channel indicated by the frequency channel information 1031. The radio-frequency carrier signal generated by the oscillator 703 is inputted into the switch 704.

The switch 704 turns on and off according to the pulse train, which the pulse interval modulating unit 105 outputs, to carry out the OOK modulation and to generate a radio-frequency signal. The OOK-modulated radio-frequency signal is amplified by the amplifier 705. Then, once the bandpass filter removes an unnecessary signal other than a signal in the channel bandwidth, the radio-frequency signal is transmitted from the antenna 107.

It is noted that the example in FIG. 7 shows the technique that the output from the oscillator 703 is OOK-modulated by the switch 704; instead, another technique may be applied. For example, the following may be applied: The oscillator 703 itself may turns on and off, or the amplifier 705 is replaced with a variable amplifier so that the gain may be changed according to the pulse train. Furthermore, instead of the OOK modulation, other modulation techniques, such as the frequency-shift keying (FSK) and the phase-shift keying (PSK), are also available.

Detailed hereinafter is an operation of the radio (receiver) 102 which receives the wake-up signal transmitted as described above.

Upon received by the antenna 109, the signal is converted by the frequency converting unit 110 from a radio-frequency signal to a signal in a frequency band suitable for the following signal processing. It is noted that the conversion shall be detailed later in FIG. 8.

Here, the frequency converting unit 110 detects the envelope of the OOK-modulated radio-frequency signal, and converts the radio-frequency signal to a received pulse train in the baseband bandwidth.

The received pulse train has its pulse interval demodulated by the pulse interval demodulating unit 111. Hence, the received pulse train is converted into a received sequence of symbols indicated in a pulse interval. The received sequence of symbols is decoded by the decoding unit 112 based on the encoding table, and converted into an information bit string and frequency channel information 112I (the frequency channel information 1031). It is noted that the converted frequency channel information 112I indicates the same frequency channel as the frequency channel of the frequency channel information 1031 which the base unit 101 has.

The decoded information bit string is inputted into a control unit 113.

Then, the control unit 113 determines whether or not the wake-up information 22 of the inputted information bit string is the wake-up information 22 addressed to the target radio 102 itself. When the wake-up information 22 is addressed to the target radio 102 itself, the control unit 113 uses the frequency channel information 112I sent from the decoding unit 112 in order to set the frequency channel of the frequency converting unit 106 to a frequency channel indicated by the frequency channel information 112I. Then, the control unit 113 activates the data communicating unit 114.

The data communicating unit 114 uses the frequency channel set by the control unit 113 to establish data communication with the radio 101 via the antenna 109 and the frequency converting unit 110.

Figure 8:
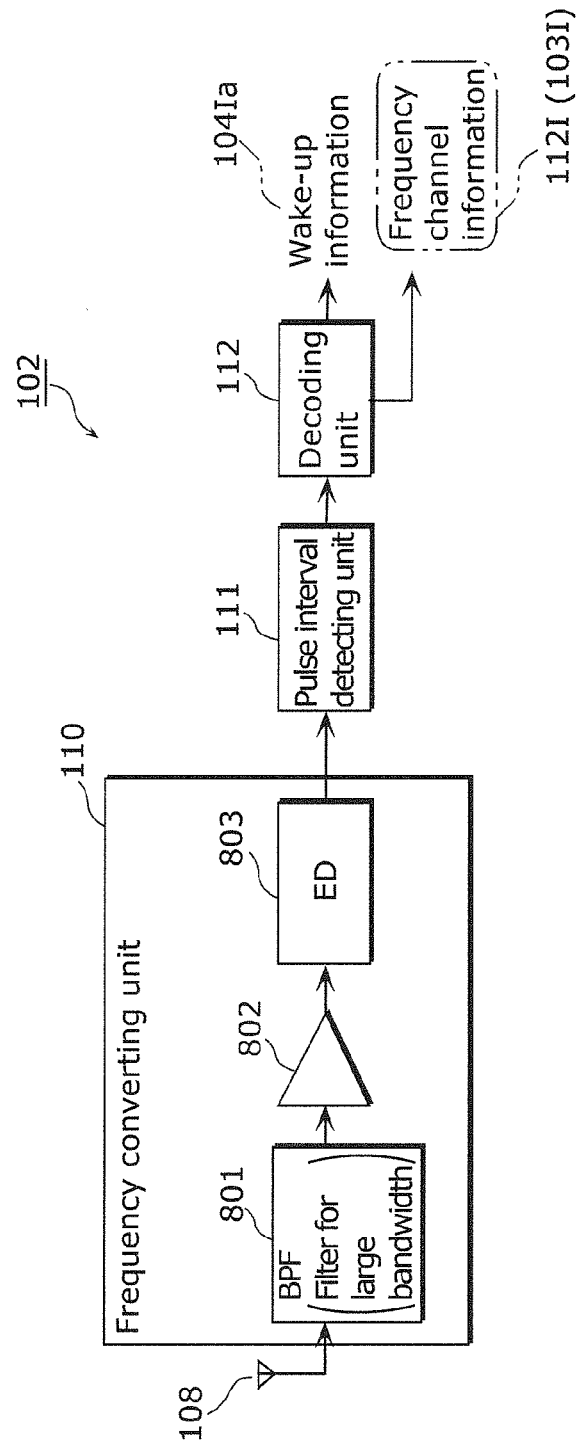
FIG. 8 exemplifies a block diagram of a structure of another radio.

FIG. 8 exemplifies a block diagram of the frequency converting unit 110.

In FIG. 8, 801, 802, and 803 respectively denote a bandpass filter, an amplifier, and an envelope detector. The other constituent features share the same reference signs as those in FIG. 1, and the details thereof shall be omitted.

The radio (receiver) 102 cannot tell over which channel the wake-up signal (the radio-frequency signal of the signal 51s) is addressed to itself. Thus, the frequency converting unit 110 is set to receive broadly the signals including the multiple frequency channels. For example, the bandpass filter 801 is set to have a passband width three times (a bandwidth 41 in FIG. 4) as wide as a channel bandwidth (a bandwidth 42 in FIG. 4) in order to receive all the frequency channels CH1 to CH3 in FIG. 4. In other words, the bandwidth 41 for filtering in the radio 102 is a relatively wide bandwidth which is three times as wide as the relatively narrow bandwidth 42 of one channel.

After passing the bandpass filter 801, the three channels of the radio-frequency signal are amplified by the amplifier 802 and have the envelope detected by the envelope detector 803. In other words, the OOK-modulated reception signal is frequency-converted into a signal (the signal 11c in FIG. 11) in the baseband by the envelope detection, so that the reception signal is converted into a pulse train. Here, the frequency characteristics of the envelope detection cause the three channels of the radio-frequency signal to be overlapped in the baseband and converted.

Hence, including the radio-frequency signals of CH1 to CH3 and provided to the frequency converting unit 110, the input signal 110A (FIG. 13) is converted into the signal 11c (FIGS. 11 and 13) including all of the low-frequency signals transmitted by each of the radio-frequency signals.

Here, it is noted that signals (the signals 11a and 11b in FIG. 11) transmitted from different transmitters over different channels have different reception levels with each other, leading to different amplitude levels of the envelopes. Accordingly, the pulse amplitudes of the converted pulse trains are different with each other. This will be detailed later.

Figure 11:
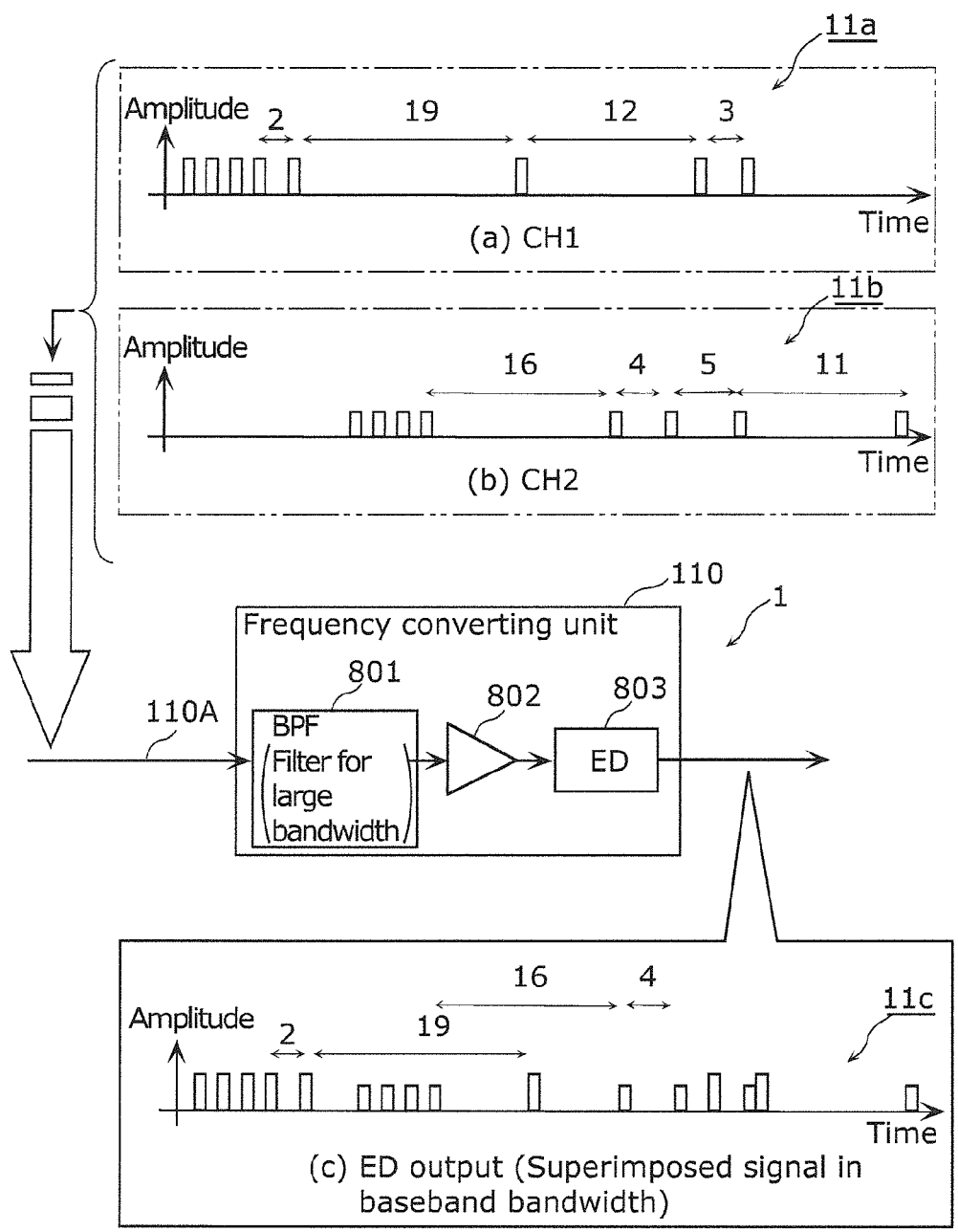
FIG. 11 exemplifies an envelope detection output.

FIG. 11 exemplifies an envelope detection output.

In FIG. 11, the horizontal axis and the vertical axis respectively show time and amplitude. The squares schematically show pulses. The signal (a) (the signal 11a) in FIG. 11 is transmitted on CH1. The signal (b) (the signal 11b) in FIG. 11 is transmitted on CH2. When the two signals (specifically, a radio-frequency signal including the two signals) are inputted into the envelope detector (a detecting unit) 803 of the frequency convert unit 110, the output is represented in (c) (the signal 11c) in FIG. 11. The signal 11c includes overlapped received pulse trains each having different amplitudes.

The output (the signal 11c) from the envelope detector 803 is inputted into the pulse interval demodulating unit 111. In the pulse interval demodulating unit 111, the pulse intervals between the pulses are detected.

Figure 9:
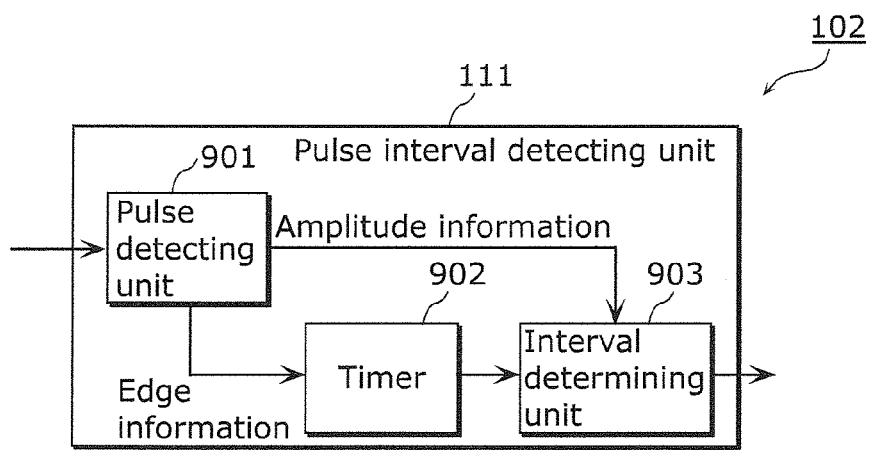
FIG. 9 exemplifies a pulse interval demodulating unit.

FIG. 9 exemplifies a block diagram of the pulse interval demodulating unit 111.

In FIG. 9, 901, 902, and 903 respectively denote a pulse detecting unit, a timer, and an interval determining unit.

The pulse detecting unit 901 detects an amplitude change of the inputted pulse train (the signal 11c), and outputs amplitude information and edge information. Here, the amplitude information may be the peak amplitude of a pulse, for example. The edge information may include timing information of the points where the amplitude value exceeds a predetermined threshold (a rising edge) and where the amplitude value goes below a predetermined threshold (a falling edge). The edge information of the pulse detected by the pulse detection unit 901 is inputted to the timer 902.

The timer 902 measures a time period between two edges. For example, the timer 902 measures a time period between two consecutive rising edges. The timer 902 may also measures a time period between a rising edge and the following falling edge as a pulse interval. In addition, the timer 902 may measure a time period between a rising edge and the following falling edge as a pulse width. The time period lying between the two edges and measured by the timer 902 is inputted to the interval determining unit 903.

The interval determining unit 903 determines a pulse interval. Specifically, the interval determining unit 903 detects a preamble out of the intervals between the edges of the pulses measured by the timer 902, and detects a reference interval.

In detecting the preamble, for example, the following can be detected: When a signal having the same pulse widths and pulse intervals is repeated, the time period between a rising edge and the following falling edge is half as long as the time period between the rising edge and the following rising edge. When such a timing relationship sequentially occurs, the preamble is considered to be detected. The pulse interval which obtained in the above detection is stored as the reference interval.

More preferably, each of the pulse width and the pulse interval detected during the preamble may be averaged, such that the reference interval can be obtained more accurately.

The detected preamble is followed by the pulse train with the pulse intervals modulated. Thus, the interval determining unit 903 determines the intervals of the received pulse train to be inputted according to the reference interval. When the pulse train in FIG. 5 is inputted, for example, outputted is a sequence (2, 19, 12, 3, 2, 19) indicating the pulse intervals.

More preferably, for example, the interval determining unit 903 may determine intervals between pulses having substantially the same amplitudes based on the amplitude information detected by the pulse detection unit 901. When the pulse train shown in (c) in FIG. 11 is inputted to the pulse detection unit 901, for example, outputted are (i) a sequence (2, 19, 12, 3) obtained by the determination between the intervals having a large amplitude and (ii) a sequence (16, 4, 5, 11) obtained by the determination between the intervals having a small amplitude.

The decoding unit 112 decodes the sequence indicating the pulse intervals determined (outputted) by the pulse interval demodulating unit 111. Specifically, the decoding unit 112 carries out a reverse lookup with the encoding table used by the encoding unit 104 in FIG. 6 to obtain (calculate) information bits and the frequency channel information 112I. When the sequence (2, 19, 12, 3, 2, 19) indicating the pulse intervals is inputted, for example, the decoding unit 112 separates the sequence into symbols each having a pair of numbers (2,19), (12,3), (2,19). According to the encoding table in FIG. 6, the symbols are the ones for the frequency channel CH1; that is, (2,19), (12,3), (2,19) respectively represent the information bits 0, 1, 0. Such a decoding operation reproduces the frequency channel information 112I and the information bits out of the sequence indicating the pulse intervals.

Figure 10:
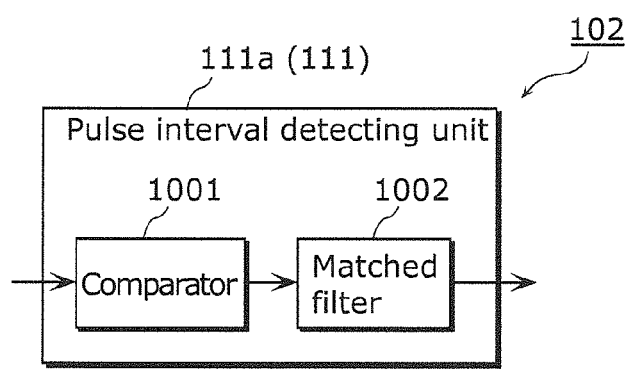
FIG. 10 exemplifies another pulse interval demodulating unit.

FIG. 10 exemplifies another schematic view (a pulse interval demodulating unit 111a) of the pulse interval demodulating unit (a pulse interval detecting unit) 111.

In FIGS. 10, 1001 and 1002 respectively denote a comparator and a matched filter.

The comparator 1001 determines a signal exceeding a predetermined threshold as a pulse, and inputs the pulse to the matched filter 1002.

The matched filter 1002 is set to detect a pulse interval based on the code table in FIG. 6 in order to detect a pulse interval having a high correlation with the received pulse train; namely, an information symbol.

For example, from among parts in the signal 11c in FIG. 11, the matched filter 1002 may detect a part corresponding to a pattern of the codes (the code 61 to 63) indicating a frequency channel, so that the matched filter 1002 can detect that the detected part is the part of the codes in the pattern.

Furthermore, the information symbol may be reproduced as follows: The signal (the signal 11c) outputted by the envelope detector 803 is temporarily stored in memory, each of the average of a pulse width and the average of a pulse interval is obtained out of the entire pulse train, and relative intervals between the pulses are determined based on the pulse width and the average with reference to the code table for the reproduction of the information symbol. Such demodulation allows the preamble section transmitting the reference interval to be shortened or eliminated, which contributes to further reduction of communication overheads.

As described above, the information bit string and the frequency channel information 112I decoded by the decoding unit 112 are inputted to the control unit 113.

The control unit 113 determines whether or not (i) the inputted information bit string is the wake-up information 22 and (ii) the address ID 222 included in the wake-up information 22 is regarded to be addressed to the target radio 102 itself.

Here, it is noted that the phrase "regarded to be addressed to the target radio 102 itself" means that the address ID 222 corresponds to (i) the ID of the target radio 102 itself, (ii) a group ID including the target radio 102 itself, and (iii) the broadcast ID.

The control unit 113 activates the data communicating unit 114 in the case where (i) the inputted information bit string is determined to be the wake-up information 22, (ii) the information bit string is decoded with no error by the FCS 223 in the wake-up information 22, and (iii) the wake-up information 22 is the one whose address ID 222 included in the wake-up information 22 is addressed to the target radio 102 itself.

Moreover, set for the frequency converting unit 110 is a frequency channel indicated by the frequency channel information 112I detected by the decoding unit 112. In data communication, for example, the frequency converting unit 110 switches the bandwidths of the bandpass filter 801 depending on the modulation scheme in the data communication, such that the target radio 102 receives only the set frequency channel. When using a modulation scheme other than the OOK in data communication, the envelope detector 803 may be replaced with an oscillator and a mixer (not shown) as a frequency convertor. Once activated, the data communicating unit 114 performs data communication with the radio 101 via the frequency converting unit 110 and the antenna 109.

The use of the wake-up signal 1R described above indicates the frequency channel (frequency channel information 112I) for the data communication, depending whether the code encoding the wake-up information 22 is which of the codes 61 to 63. This operation successfully transmits, at once, the wake-up information 22 and the frequency channel information 112I indicated in a kind of the code of the wake-up information 22. Hence, the radio (receiver) 102 can appropriately work even though the radio 103 cannot directly tell whether the wake-up signal 1R addressed to itself is transmit over which frequency channel. In other words, demodulating the pulse intervals based on the encoding table, the radio (receiver) 102 can detect over which frequency channel the wake-up signal 1R has been transmitted, based on the kind of the code specified by the modulation. Based on the kind of the code, this detection can indirectly specify the frequency channel. Furthermore, performing the data communication over the frequency channel detected above eliminates the need for a channel negotiation in the data communication for synchronizing the channel of the communicating parties, which contributes to the overheads caused by the channel negotiation.

It is noted that the wake-up information (the wake-up information 32 in FIG. 3) may include frequency channel information (a data channel number 322 in FIG. 3) for data communication. Here, the designated frequency channel for the data communication may be a frequency channel other than the frequency channel on which the wake-up signal 1R is transmitted. For example, such wake-up information may be used for (i) a data communication with two or more frequency channel bonded, using a wider-bandwidth modulating scheme and (ii) an operation as a channel hopping which designates a frequency channel with little interference.

Hence, the communications method and the communications apparatus according to the embodiment successfully reduce power consumption in wake-up communication for notifying of a frequency channel used for data communication. Specifically, the communications method involves selecting a frequency channel to be used for data communication from among two or more frequency channels. A transmitter (the base unit 101) transmits a wake-up signal (the wake-up signal 1R) over the frequency channel to the communication path of the frequency channel. Here, the transmitted wake-up signal is pulse-interval-modulated wake-up information (the wake-up information 22) including at least the address (the address ID 222) of a communication partner. Such pulse interval modulation is executed based on a code (the code 61, for example) assigned to a frequency channel for the transmission. The receiver (the sub unit 102) receives broadly the signals including the multiple frequency channels, carries out the pulse interval demodulation based on the code, and reproduces the wake-up information. When the address is directed to the receiver itself, the receiver detects the transmitted frequency channel (CH1) based on the code (the code 61) used for the pulse interval demodulation. Accordingly, the detected frequency channel is used for the data communication.

In other words, the operation below may be carried out.

Figure 12:
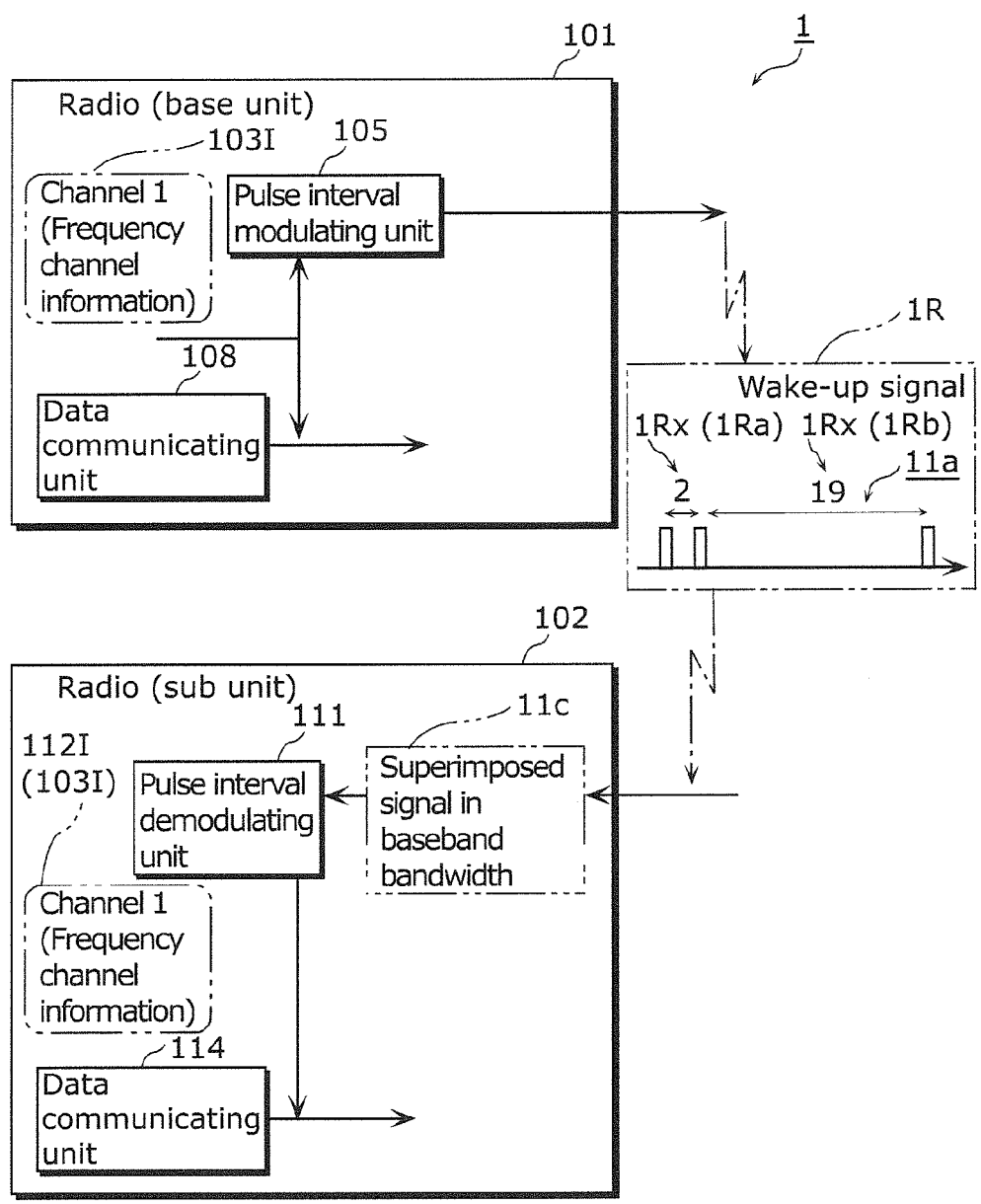
FIG. 12 shows a base unit and a sub unit.
Figure 17:
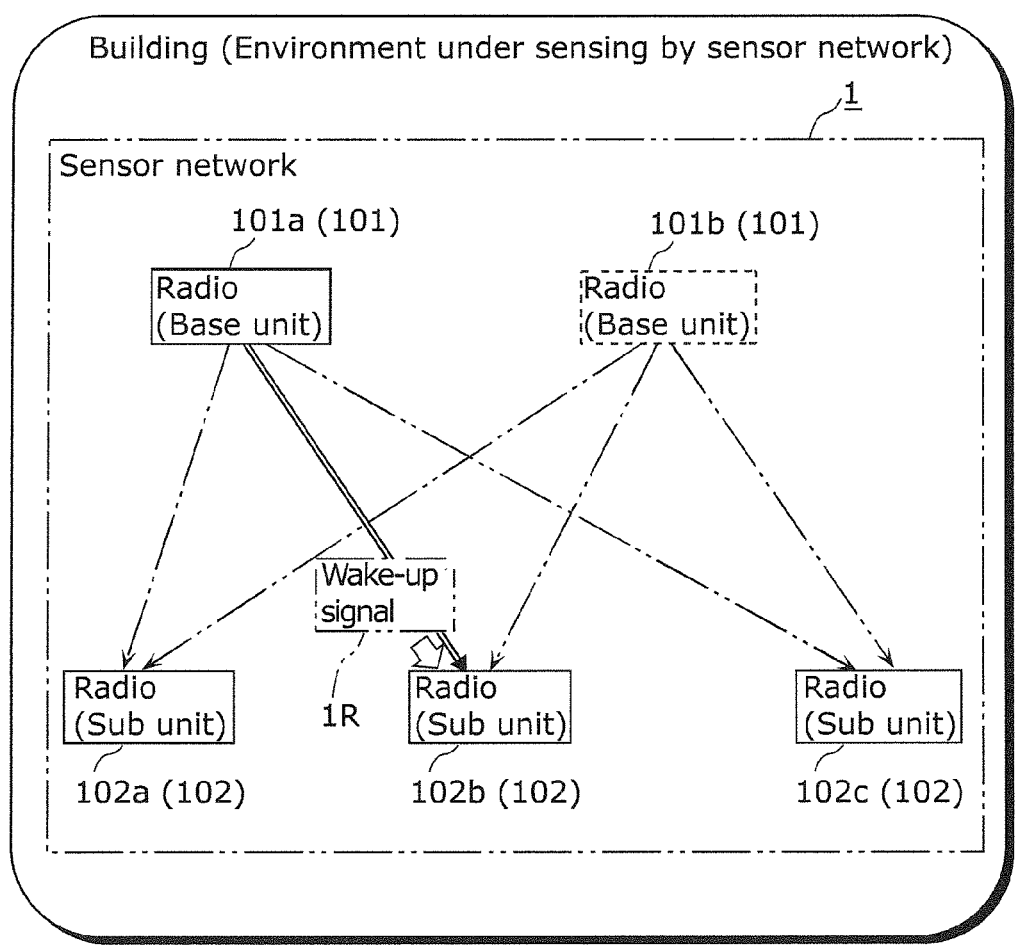
FIG. 17 depicts a diagram of the system.

A system 1 including the base unit 101 and the sub unit 102 is prepared (FIGS. 1, 12, and 17).

Specifically, for example, the sub unit 102 may obtain environmental information (such as temperature and humidity). In the data communication between the sub unit 102 and the base unit 101, the obtained information may be exchanged. In other words, the system 1 may be a sensor network system. One of or both of the base unit 101 and sub unit 102 may employ the radio frequency identification (RFID).

More specifically, for example, the system 1 may include two or more of the sub units 102 (sub units 102a to 102c) and base units 101 (base units 101a and 101b) as shown in FIG. 17. Then, for example, each of the base units 101 may perform data communication with the sub units 102. Each of the sub units 102 may be placed at a different position in the building. Then, each sub unit 102 may obtain information on the position of its own (temperature, for example), and performs data communication with the related base unit 101.

Here, each of the sub units 102 is a radio which desirably requires very low power consumption. The sub unit 102 is, for example, a battery-operated radio having a long operating time.

For example, the sub unit 102 detects whether or not the wake-up signal 1R for starting the data communication has been transmitted by the base unit 101. The sub unit 102 causes functional units other than the functional units for the detection (such as the frequency converting unit 110, the pulse interval demodulating unit 111, and the decoding unit 112) (i) to consume (large) power only in the case where the sub unit 102 detects that the base unit 101 has transmitted the wake-up signal 1R for initiating the data communication and (ii) not to consume (large) power in the case of a normal operation in which the transmission has not been detected.

In the data communication, meanwhile, a signal (a low-frequency signal) in the baseband bandwidth with one frequency channel is generated out of an input signal received by the antenna 109 and including radio-frequency signals having two or more frequency channels.

For generating a low-frequency signal for one frequency channel out of an input signal as described above, the conventional techniques employ a super heterodyne system in order to avoid generating an unstable signal and the resulting malfunction. Without the super heterodyne system, an inappropriate signal including much noise and large noise would be generated, causing malfunction.

The conventional techniques involves generating, out of an input signal, a low-frequency signal having one frequency channel as described above in the case of detecting whether or not the wake-up signal 1R has been transmitted, as well. Here, the one frequency channel for which the low-frequency signal is generated is, for example, the frequency channel (frequency Fa) dedicated to wake-up. Moreover, as described above, the following operations may be carried out: A low-frequency signal is generated for each of frequency channels, and the fact whether or not the low-frequency signal has been transmitted over the frequency channel is detected.

The use of the super heterodyne technique, however, inevitably consumes relatively large power since the receiver uses (i) a filter for a relatively narrow bandwidth (the bandwidth 42 in FIG. 4) in one frequency channel and (ii) a mixer and an oscillator. Here, for example, the filter for the narrow bandwidth (the bandwidth 42 in FIG. 4) includes many operational amplifiers, for example, which unfortunately uses relatively much power.

Thus, the conventional techniques have a problem of consuming much power in detecting the transmission of the wake-up signal 1R, resulting in a shorter operation time.

Thus, the first communications apparatus (the sub unit 102 in FIGS. 12 and 13) in the system 1 may carry out the operation below, for example.

Figure 13:
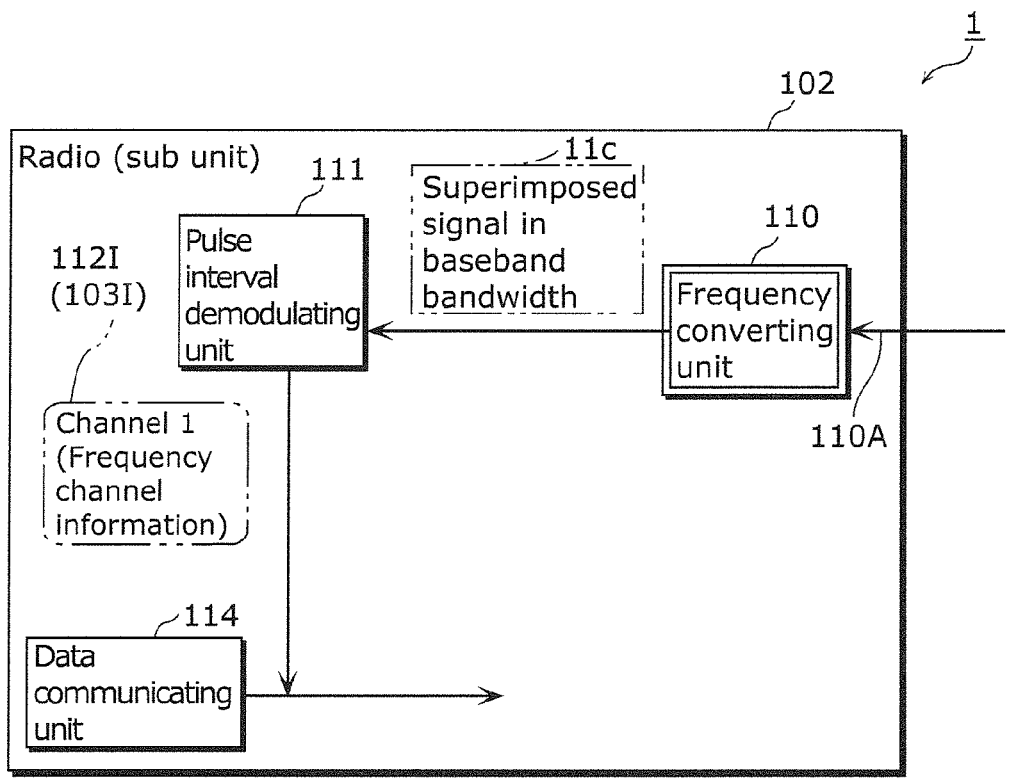
FIG. 13 shows the sub unit.

Specifically, the first communications apparatus includes the above-described frequency converting unit (the frequency converting unit 110 in FIG. 13).

Figure 14:
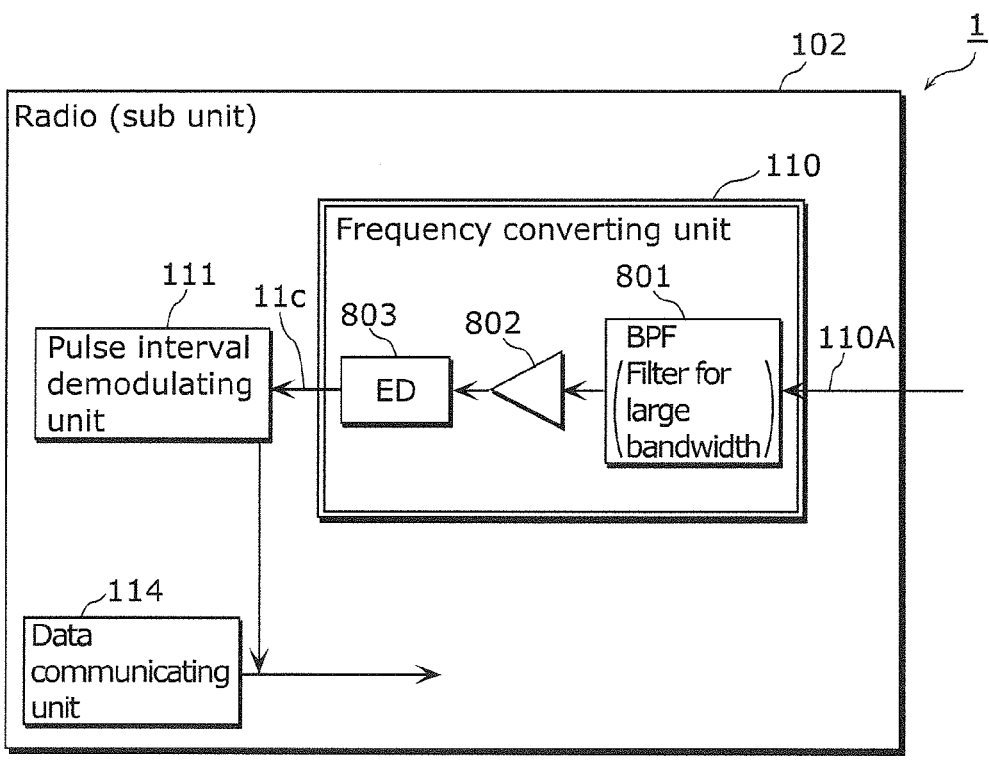
FIG. 14 shows the sub unit.
Figure 15:
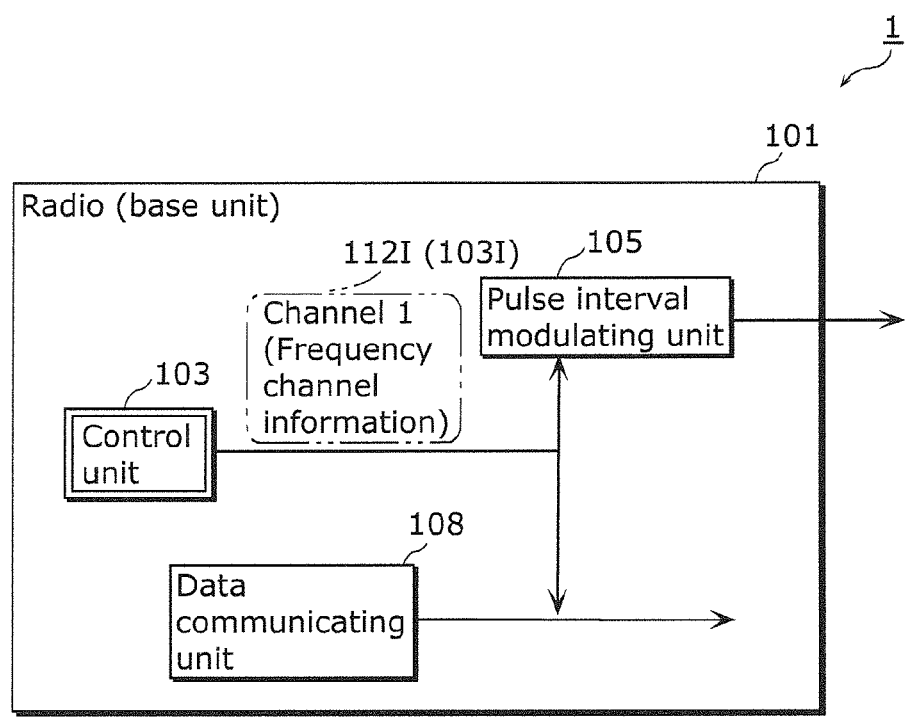
FIG. 15 shows the base unit.
Figure 16:
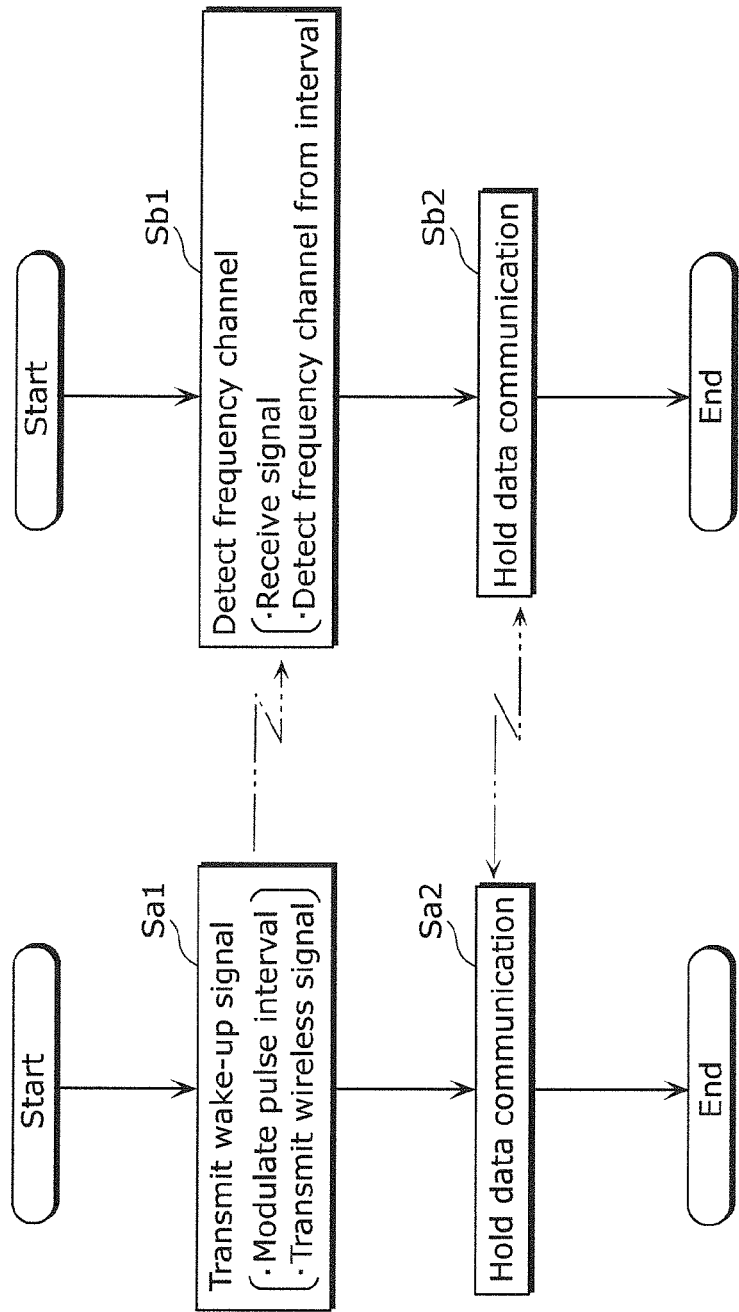
FIG. 16 depicts a flowchart of a system.

The frequency converting unit may generate, from an input signal (the input signal 110A in FIGS. 13 and 14) received via an antenna (the antenna 109 in FIG. 1) and including radio-frequency signals for the corresponding frequency channels, a low-frequency signal (the signal 11c) including low-frequency signals (the signals 11a and 11b in FIG. 11) each transmitted on a corresponding one of the radio-frequency signals (Sb1 in FIG. 16).

It is noted that the low-frequency signal (the signal 11c) to be generated has low-frequency signals (the signals 11a and 12b) with frequency channels overlapped and mixed.

Then, the frequency channel detecting unit may determine, from the generated low-frequency signal (the signal 11c), whether or not the wake-up signal (the wake-up signal 1R in FIG. 12) is already transmitted over the detected frequency channel (See CH1 (the column (a) in FIG. 11)) among the frequency channels (Sb1).

The data communicating unit (the data communicating unit 114) may (i) perform the data communication (Sb2) with the second communications apparatus (the base unit 101) when the frequency channel detecting unit detects the transmission of the wake-up signal, and (ii) avoid the data communication when the frequency channel detecting unit does not detect the transmission.

It is noted that, for example, the data communicating unit 114 may consume (i) relatively large power (Sb2) only when the transmission of the wake-up signal by the data communicating unit 114 has been detected, and (ii) relatively small power or no power when no transmission has been detected. When no transmission is detected, the sub unit may be kept in the sleep mode.

In other words, the low-frequency signal (the signal 11c) is generated by the frequency converting unit (the frequency converting unit 110) without the super heterodyne system. Thus, the frequency converting unit 110 generates the low-frequency signal with the power lower than the power consumed in the super heterodyne system.

Specifically, for example, the frequency converting unit (the frequency converting unit 110) may include: a bandpass filter (the bandpass filter 801 in FIG. 14) which filters the input signal (the input signal 110A) to generate a signal for the frequency channels (the bandwidth 41 in FIG. 4); an amplifier (the amplifier 802) which amplifies the signal; and an envelope detector (the envelope detector 803) which detects envelopes of the amplified radio-frequency signals to generate the low-frequency signal (the signal 11c) including the low-frequency signals (the signals 11a and 11b) for the frequency channels. Hence, when the low-frequency signal (the signal 11c) is generated from the input signal, the frequency converting unit may consume less power than power consumed in a super heterodyne technique to generate the low-frequency signal.

In this operation, much power is not required for detecting whether or not the wake-up signal 1R has been transmitted, which contributes to providing the communications apparatus a longer operating time.

In other words, the communications apparatus can work on a less consumption power (for a longer operating time).

Furthermore, suppose the wake-up signal 1R is transmitted over one of the frequency channels (FIG. 4). Even in the case where there are many such frequency channels (for example, 24 frequency channels), generated is only one low-frequency signal (the signal 11c) having overlapped low-frequency signals corresponding to the frequency signals. Thus, not so many signals are generated. Thus, even though there many frequency channels, the communications apparatus can continue operating on low power, which certainly contributes to less consumption power.

It is noted that the pulse interval demodulating unit 111 may detect the fact the wake-up signal 1R has been transmitted whichever frequency channel is used among the frequency channels.

This operation allows the wake-up signal 1R to be transmitted on an appropriate frequency channel, such as a frequency channel providing a high-quality communication quality, selected by the base unit 101 from among the frequency channels. This feature assures a transmission over an appropriate frequency channel.

Specifically, for example, the selected high-quality frequency channel may be a frequency channel with no transmission is made on other than the wake-up signal 1R.

This feature allows not having a frequency channel dedicated to the wake-up (the frequency Fa). Hence, when a frequency channel over which no transmission is made changes, an appropriate frequency channel is selected after the change, and this feature assures a transmission over an appropriate frequency channel. Accordingly, the wake-up signal 1R is assured to be transmitted easily on an appropriate frequency channel.

More specifically, when the data communicating unit (the data communicating unit 114) detects that the wake-up signal has been transmitted, for example, the data communication may be performed over the frequency channel indicated in the intervals (the interval 1Ra and 1Rb (the interval 1Rx) in FIG. 12) of the detected wake-up signal.

It is noted that an interval (2 of the code 61 in FIG. 6; namely, the interval 1Rx) between two pulses included in the wake-up signal may be different from an interval (the intervals for the codes 62 and 63; namely, 11 of (5, 11)) between the two pulses in a wake-up signal for any other frequency channel (CH2 and CH3) than the frequency channel (CH1, for example) for the interval 1Rx. It is noted that only the intervals between each two pulses in the codes follow the above. The intervals between each two pulses in the preamble section may be different.

The second communications apparatus (the base unit 101) may carry out the operation below.

Specifically, an interval control unit (the pulse interval modulating unit 105) may transmit the wake-up signal 1R to the sub unit 102 over one of the frequency channels (FIG. 4) (Sa1).

Then, when the wake-up signal 1R is transmitted, the data communicating unit (the data communicating unit 108) performs a data communication with the sub unit 102 receiving the wake-up signal 1R (Sa2).

Then, more specifically, the second communications apparatus may include a control unit (the control unit 103) for selecting one of the frequency channels over which the wake-up signal 1R is transmitted, and for transmitting the wake-up signal 1R over the selected frequency channel.

This feature makes it possible to perform a communication over an appropriate frequency channel relatively easily, even though there is only one frequency channel for transmitting the wake-up signal 1R.

Then, more specifically, the control unit may select a frequency channel other than the frequency channel indicated by the wake-up signal to be (i) used for a communication by a third communications apparatus (namely, a communications apparatus (the base unit 101b, for example) other than the second communications apparatus (the base unit 101a in FIG. 17, for example)) and (ii) indicated by the wake-up signal to be transmitted from the third communications apparatus.

Moreover, the third communications apparatus may select the same frequency channel as the frequency channel which has been indicated by the wake-up signal sent from the third communications apparatus and determined appropriate.

Thus, the selected frequency channel may be specified by the wake-up signal of another base unit 101b.

This feature makes it possible to select an appropriate frequency channel easily and surely.

It is noted that, specifically, the low-frequency signal (the signal 11c) which is (i) generated by the frequency converting unit 110 included in the sub unit 102 and (ii) having two or more low-frequency signals (the signals 11a and 11b) with frequency channels overlapped allows the low-frequency signals (the signals 11a and 11b) on corresponding frequency channels to be specified out of the low-frequency signal (the signal 11c) itself. Here, more specifically, specifying the low-frequency signal is to specify each information item of the low-frequency signal, such as the preamble section 21, the address ID 222, and a kind of code (the code 61) in which the preamble section 21 and the address ID 222 are encoded.

It is noted that the low-frequency signal (the signal 11a) included in the overlapped low-frequency signal (the signal 11c) and having the frequency channel (CH1, for example) over which the wake-up signal 1R has been transmitted may have an amplitude which is different from an amplitude of a low-frequency signal (the signal 11b, for example) for any other frequency channel than CH1 (See the amplitude of CH1 in the signal 11c in FIG. 11, for example).

It is noted that the amplitude of the low-frequency signal (the signal 11a) for the frequency channel (CH1, for example) on which the wake-up signal 1R has been transmitted may be an amplitude among two or more amplitudes which corresponds to the power on which the base unit 101 performs a transmission.

Then, a predetermined amplitude part of the overlapped low-frequency signal (the signal 11c), such as an amplitude corresponding to the power, may be detected by the pulse interval demodulating unit 111 as the low-frequency signal (the signal 11a) in the wake-up signal 1R.

It is noted that the wake-up signal 1R may indicate a frequency channel over which the data communication is performed. For example, the frequency channel may be indicated by (i) a kind of codes (the codes 61 to 63) with which the wake-up signal 1R has been encoded or (ii) the data channel number 322 in FIG. 3 included in the wake-up signal 1R.

Then, the data communicating unit 114 of the sub unit 102 uses the frequency converting unit 110, which is set to a frequency channel (CH1) indicated by the transmitted wake-up signal 1R, to perform a data communication over the indicated frequency channel.

The sub unit 102 may be a radio provided on a battery-powered remote control. The base unit 101 may be a radio provided on an apparatus, such as a TV, controlled by the remote control. When the TV transmits the wake-up signal 1R to the remote, a data communication may be performed between the two radios.

As described above, the base unit 101 has two or more units combined, including the pulse interval modulating unit 105. This combination develops a synergistic effect. In the sub unit 102, as well, the combination of two or more units, including the pulse interval demodulating unit 111, develops a synergistic effect. Each of the base unit 101 and the sub unit 102 is different from that in the conventional technique in terms of structure, function, and effect.

Although only an exemplary embodiments of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

It is noted that each of the constituent features in the embodiment may be provided in the form of an integrated circuit; namely, a Large Scale Integrated circuit. The constituent features may be formed in one chip. In other words, each unit of the constituent features may be made as separate individual chips, or as a single chip to include a part or all thereof. Here, here, the LSI may also referred to IC, LSI, super LSI, and ultra LSI, depending on the degree of integration. Furthermore, the means for circuit integration is not limited to an LSI, and implementation with a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable. The operations on such functional blocks may be executed by, for example, a digital signal processor (DSP) and a central processing unit (CPU). Furthermore, such functional blocks may be stored in a storage medium as a program. By executing the stored program, the operations may be executed as processing steps.

Furthermore, if integrated circuit technology that replaces LSI appears thorough progress in semiconductor technology or other derived technology, that technology can naturally be used to carry out integration of the constituent elements. Biotechnology can be such replacing technology.

It is noted that mare details may be structured in any form. In other words, for example, the details may be structured in any form other than the forms described above. Such details may be structured based on the prior art, improved, and formed in other scheme than the prior art and the improvement. The system in any case may belong to the scope of the system 1 as far as an implementation of the present invention is applied.

In addition, the above-described multiple technical aspects that are far apart with each other may be combined appropriately.

Moreover, the following may be provided: a method including each of the above steps, a computer program executing each of the above functions, a storage medium storing the computer program, and an integrated circuit having each of the functions.

INDUSTRIAL APPLICABILITY

The technique can be widely applied to a typical communications apparatus which uses two or more frequency channels and performs little communication for long standby time with low power consumption required (the RFID, a wireless sensor network, and a wireless remote control, for example).

REFERENCE SIGNS LIST

1R Wake-up signal
11c Signal
101 Radio
102 Radio
103 and 113 Control unit
104 Encoding unit
105 Pulse interval modulating unit
106 and 110 Frequency converting unit
107 and 109 Antenna
108 and 114 Data communicating unit
111 Pulse interval demodulating unit
112 Decoding unit

The invention claimed is:

1. A communications apparatus comprising:
a data communicating unit configured to perform data communication; and
a frequency channel detecting unit configured to (i) detect a frequency channel from a time interval between two pulses of a signal with signals for corresponding frequency channels overlapped, the frequency channel being detected with reference to a table which previously associates a time interval between two pulses in a wake-up signal with each of the frequency channels, and (ii) cause said data communicating unit to perform the data communication over the detected frequency channel, the detected frequency channel being the frequency channel of the wake-up signal,
wherein the detected frequency channel indicated by the interval between the two pulses is selected from among the frequency channels by a second communications apparatus which is different from said communications apparatus that is a first communications apparatus,
the wake-up signal is generated of wake-up information including at least address information by pulse interval modulation based on a code assigned to the frequency channel over which the wake-up signal is transmitted, the address information specifying a partner communications apparatus performing data communication with the second communications apparatus,
said frequency channel detecting unit is configured to:
(i) carry out pulse interval demodulation on the signal including the signals for the corresponding frequency channels, based on the code of the wake-up signal, to reproduce the wake-up information, and (ii) when the address information included in the wake-up information specifies the first communications apparatus, detect the frequency channel assigned to the code as the frequency channel over which the wake-up signal is transmitted, based on the code used for pulse interval demodulation, so as to have said data communicating unit use the detected frequency channel for the data communication,
the first communications apparatus is (i) a part of an apparatus included in a sensor network and obtaining information and (ii) different from the second communications apparatus which transmits the wake-up signal to establish the data communication with the first communications apparatus,
said communications apparatus further comprises a frequency converting unit configured to generate, from an input signal received via an antenna and including radio-frequency signals for the corresponding frequency channels, a low-frequency signal including low-frequency signals each transmitted on a corresponding one of the radio-frequency signals,
said frequency channel detecting unit is configured to determine, from the generated low-frequency signal, whether or not the wake-up signal is already transmitted over the detected frequency channel among the frequency channels, and
said data communicating unit is configured to (i) perform the data communication with the second communications apparatus when said frequency channel detecting unit detects the transmission of the wake-up signal, and (ii) avoid the data communication when said frequency channel detecting unit does not detect the transmission.

2. The communications apparatus according to claim 1, wherein said frequency converting unit includes:
a bandpass filter which filters the input signal to generate a signal for the frequency channels;
an amplifier which amplifies the signal; and
an envelope detector which detects envelopes of the amplified radio-frequency signals to generate the low-frequency signal including the low-frequency signals for the frequency channels, and
when the low-frequency signal is generated from the input signal, said frequency converting unit consumes less power than power consumed in a super heterodyne technique to generate the low-frequency signal.

3. The communications apparatus according to claim 2, wherein, when said frequency channel detecting unit detects the transmission of the wake-up signal, said data communicating unit is configured to perform the data communication over the frequency channel indicated by the interval of the detected wake-up signal.

4. The communications apparatus according to claim 1, wherein the table previously associates the time interval between the two pulses in the wake-up signal with each of pairs, each of the pairs being a combination of one of the frequency channels and one of codes, and
said frequency channel detecting unit configured to (i) identify, with reference to the table and from the time interval between the two pulses of the signal with the signals for the corresponding frequency channels overlapped, the code and the frequency channel of the wake-up signal among the signals for the corresponding frequency channels, (ii) decode the identified code and obtain wake-up information including address information, and (iii) cause said data communicating unit to perform the data communication over the identified frequency channel in the case where address information included in the wake-up information indicates said communications apparatus.

5. A communications system comprising:
a first communications apparatus; and
a second communications apparatus,
wherein said second communications apparatus includes:
   a second data communicating unit configured to perform data communication over a frequency channel selected from among frequency channels with said first communications apparatus; and
   an interval control unit configured to generate a wake-up signal with reference to a table which previously associates a time interval between two pulses in the wake-up signal with each of the frequency channels, and transmit the wake-up signal to the first communications apparatus, the wake-up signal including two pulses indicating the selected frequency channel,
said first communications apparatus includes:
   a first data communicating unit configured to perform the data communication; and
   a frequency channel detecting unit configured to (i) detect a frequency channel from a time interval between two pulses of a signal with signals for corresponding frequency channels overlapped, the frequency channel being detected with reference to the table which previously associates the time interval between two pulses in the wake-up signal with each of the frequency channels, and (ii) cause said first data communicating unit to perform the data communication over the detected frequency channel, the detected frequency channel being the frequency channel of the wake-up signal,
said second communications apparatus includes:
   a control unit configured to (i) output (a) wake-up information including address information specifying a partner of the data communication performed by said second data communicating unit and (b) frequency channel information specifying the frequency channel over which the wake-up signal is transmitted and (ii) control activation of said second data communicating unit; and
   an encoding unit configured to encode the outputted wake-up information based on a code assigned to the outputted frequency channel information,
said interval control unit is configured to generate pulses and convert an output from said encoding unit into an interval between the generated pulses,
said second communications apparatus includes:
   a second frequency converting unit configured to convert an output from said interval control unit into a wireless signal having the frequency channel over which the wake-up signal is transmitted; and
   a second antenna from which an output of said second frequency converting unit is transmitted,
based on the control of the activation of said second data communicating unit by said control unit, said second data communicating unit is configured to perform the data communication with the partner via said second frequency converting unit and said second antenna,
said first communications apparatus includes:
   a first antenna which receives the wireless signal;
   a first frequency converting unit configured to convert the wireless signal received by said first antenna into the signal (i) having a predetermined frequency band suitable to demodulation and (ii) including the signals having corresponding frequency channels; and
   a decoding unit,
said frequency channel detecting unit is configured to detect the interval between the two pulses of the signal (i) converted by said first frequency converting unit and (ii) including the signals having the corresponding frequency channels,
said decoding unit is configured to decode the detected interval based on the code indicated by the interval to detect the wake-up information and the frequency channel information, the interval being at least one interval,
when the address information included in the wake-up information outputted by said decoding unit specifies said first communications apparatus, said first data communicating unit is configured to perform the data communication with said second communications apparatus over the specified frequency channel, based on the frequency channel information detected by said decoding unit, using said first frequency converting unit which is set to the frequency channel to be indicated by the frequency channel information.

6. The communications system according to claim 5,
wherein the table previously associates the time interval between the two pulses in the wake-up signal with each of pairs, each of the pairs being a combination of one of the frequency channels and one of codes, and
said frequency channel detecting unit configured to (i) identify, with reference to the table and from the time interval between the two pulses of the signal with the signals for the corresponding frequency channels overlapped, the code and the frequency channel of the wake-up signal among the signals for the corresponding frequency channels, (ii) decode the identified code and obtain wake-up information including address information, and (iii) cause said data communicating unit to perform the data communication over the identified frequency channel in the case where address information included in the wake-up information indicates said communications apparatus.

7. A communications method performed by a first communications apparatus, the communications method comprising:
performing data communication; and
(i) detecting a frequency channel from a time interval between two pulses of a signal with signals for corresponding frequency channels overlapped, the frequency channel being detected with reference to a table which previously associates a time interval between two pulses in a wake-up signal with each of the frequency channels, and (ii) causing in said performing to perform the data communication over the detected frequency channel, the detected frequency channel being the frequency channel of the wake-up signal,
wherein the detected frequency channel indicated by the interval between the two pulses is selected from among the frequency channels by a second communications apparatus which is different from the first communications apparatus,
the wake-up signal is generated of wake-up information including at least address information by pulse interval modulation based on a code assigned to the frequency channel over which the wake-up signal is transmitted, the address information specifying a partner communications apparatus performing data communication with the second communications apparatus, said detecting includes:
(i) carrying out pulse interval demodulation on the signal including the signals for the corresponding frequency channels, based on the code of the wake-up signal, to reproduce the wake-up information, and (ii) when the address information included in the wake-up information specifies the first communications apparatus, detecting the frequency channel assigned to the code as the frequency channel over which the wake-up signal is transmitted, based on the code used for pulse interval demodulation, so as to have said performing use the detected frequency channel for the data communication, the first communications apparatus is (i) a part of an apparatus included in a sensor network and obtaining information and (ii) different from the second communications apparatus which transmits the wake-up signal to establish the data communication with the first communications apparatus, said communications method further comprises generating, from an input signal received via an antenna and including radio-frequency signals for the corresponding frequency channels, a low-frequency signal including low-frequency signals each transmitted on a corresponding one of the radio-frequency signals, said detecting includes determining, from the generated low-frequency signal, whether or not the wake-up signal is already transmitted over the detected frequency channel among the frequency channels, and said performing (i) performs the data communication with the second communications apparatus when said detecting detects the transmission of the wake-up signal, and (ii) avoids the data communication when said detecting does not detect the transmission.

8. The communications method according to claim 7, wherein the table previously associates the time interval between the two pulses in the wake-up signal with each of pairs, each of the pairs being a combination of one of the frequency channels and one of codes, said detecting includes (i) identifying, with reference to the table and from the time interval between the two pulses of the signal with the signals for the corresponding frequency channels overlapped, the code and the frequency channel of the wake-up signal among the signals for the corresponding frequency channels, and (ii) decoding the identified code and obtain wake-up information including address information, and said causing includes (iii) causing said data communicating unit to perform the data communication over the identified frequency channel in the case where address information included in the wake-up information indicates said communications apparatus.

9. An integrated circuit included in a first communications apparatus, the integrated circuit comprising:
a data communicating unit configured to perform data communication; and
a frequency channel detecting unit configured to (i) detect a frequency channel from a time interval between two pulses of a signal with signals for corresponding frequency channels overlapped, the frequency channel being detected with reference to a table which previously associates a time interval between two pulses in a wake-up signal with each of the frequency channels, and (ii) cause said data communicating unit to perform the data communication over the detected frequency channel, the detected frequency channel being the frequency channel of the wake-up signal, wherein the detected frequency channel indicated by the interval between the two pulses is selected from among the frequency channels by a second communications apparatus which is different from the first communications apparatus, the wake-up signal is generated of wake-up information including at least address information by pulse interval modulation based on a code assigned to the frequency channel over which the wake-up signal is transmitted, the address information specifying a partner communications apparatus performing data communication with the second communications apparatus, said frequency channel detecting unit is configured to:
(i) carry out pulse interval demodulation on the signal including the signals for the corresponding frequency channels, based on the code of the wake-up signal, to reproduce the wake-up information, and (ii) when the address information included in the wake-up information specifies the first communications apparatus, detect the frequency channel assigned to the code as the frequency channel over which the wake-up signal is transmitted, based on the code used for pulse interval demodulation, so as to have said data communicating unit use the detected frequency channel for the data communication, the first communications apparatus is (i) a part of an apparatus included in a sensor network and obtaining information and (ii) different from the second communications apparatus which transmits the wake-up signal to establish the data communication with the first communications apparatus, said integrated circuit further comprises a frequency converting unit configured to generate, from an input signal received via an antenna and including radio-frequency signals for the corresponding frequency channels, a low-frequency signal including low-frequency signals each transmitted on a corresponding one of the radio-frequency signals, said frequency channel detecting unit is configured to determine, from the generated low-frequency signal, whether or not the wake-up signal is already transmitted over the detected frequency channel among the frequency channels, and said data communicating unit is configured to (i) perform the data communication with the second communications apparatus when said frequency channel detecting unit detects the transmission of the wake-up signal, and (ii) avoid the data communication when said frequency channel detecting unit does not detect the transmission.

10. The integrated circuit according to claim 9, wherein the table previously associates the time interval between the two pulses in the wake-up signal with each of pairs, each of the pairs being a combination of one of the frequency channels and one of codes, and said frequency channel detecting unit configured to (i) identify, with reference to the table and from the time interval between the two pulses of the signal with the signals for the corresponding frequency channels overlapped, the code and the frequency channel of the wake-up signal among the signals for the corresponding frequency channels, (ii) decode the identified code and obtain wake-up information including address information, and (iii) cause said data communicating unit to perform the data communication over the identified frequency channel in the case where address information included in the wake-up information indicates said communications apparatus.

\* \* \* \* \*